2,695,918
Patented Nov. 30, 1954

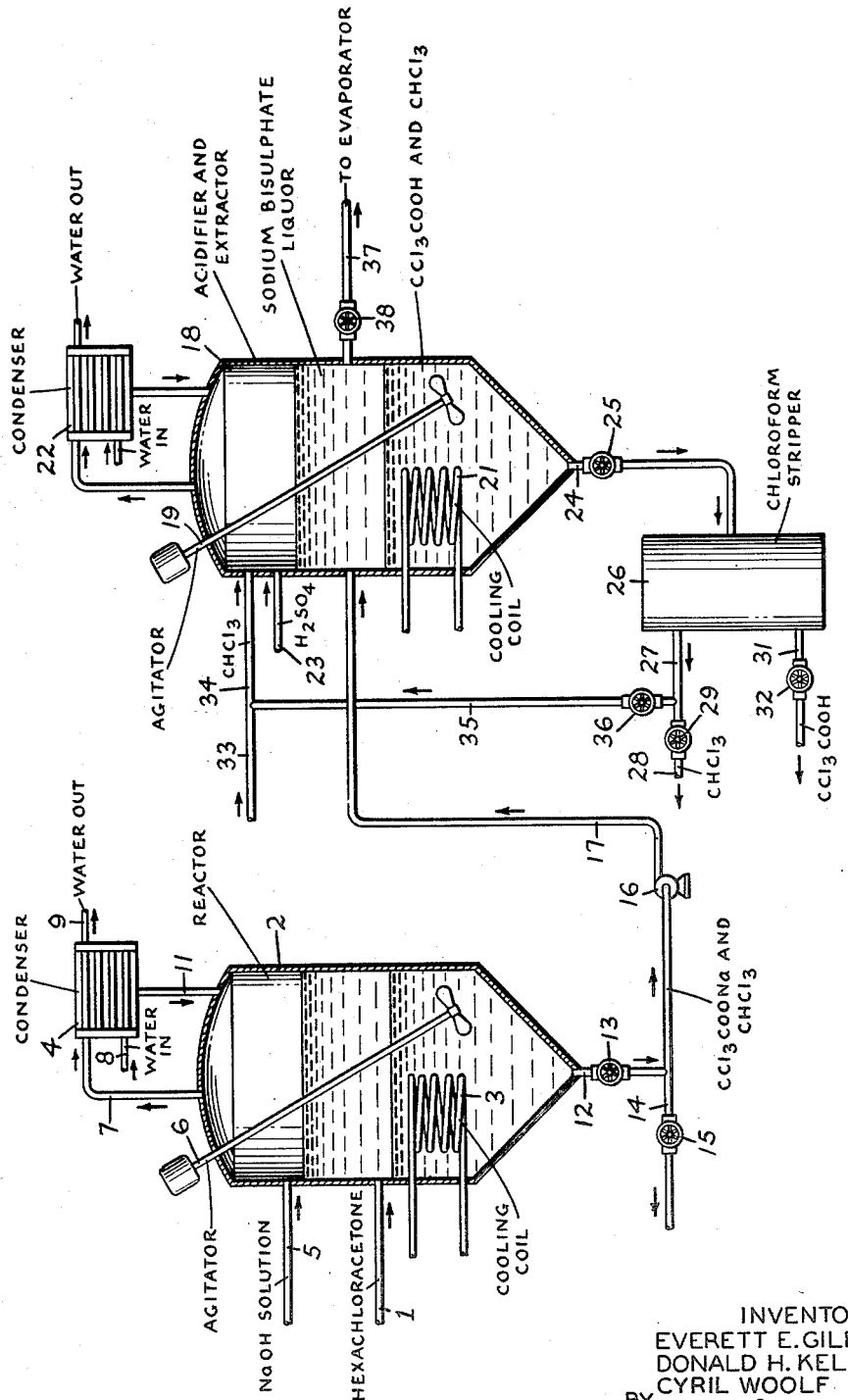

UNITED STATES PATENT OFFICE 2,695,918

CONVERSION OF HEXACHLOROACETONE INTO TRICHLOROACETIC AND CHLOROFORM AND SEPARATION AND RECOVERING OF TRICHLOROACETIC ACID

Everett E. Gilbert, Flushing, Donald H. Kelly, New Hyde Park, and Cyril Woolf, Long Island City, N. Y., assignors to Allied Chemical & Dye Corporation, New York, N. Y., a corporation of New York Application September 4, 1952, Serial No. 307,878

16 Claims. (Cl. 260—539)

This invention relates to the manufacture and recovery of trichloroacetic acid and, more particularly, refers to a new and improved method of converting hexachloroacetone to trichloroacetic acid and chloroform and the separation and recovery of trichloroacetic acid.

The conventional method for the preparation of trichloroacetic acid is by oxidation of chloral with fuming nitric acid, permanganate or potassium chlorate. These procedures have several disadvantages including destruction of a material portion of the charging material due to the use of strong oxidizing agents, low yields of desired trichloroacetic acid, expensive operation due in part to costly reactants, and difficulty in separating and recovering trichloroacetic acid due to the presence of the various contaminants in the reaction products resulting from side reactions.

One object of the present invention is to provide an efficient process for converting hexachloroacetone and recovering trichloroacetic acid.

Another object of this invention is to provide an economical process for producing high yields of high purity trichloroacetic acid and chloroform.

A further object of this invention is to provide an improved method of acidifying a salt of trichloroacetic acid and extracting and recovering the resultant trichloroacetic acid.

Further objects and advantages will be apparent from the following description and drawing.

In accordance with the present invention, conversion of hexachloroacetone may be accomplished by intimately mixing hexachloroacetone with an aqueous solution of an alkaline metal compound at a temperature below 60° C., desirably not below 0° C., preferably 25–30° C., for a sufficient length of time to effect scission of the hexachloroacetone molecule and reaction with the aqueous alkaline metal compound to produce a metal salt of trichloroacetic acid and chloroform. Scission of hexachloroacetone and reaction with sodium hydroxide solution to produce chloroform and a solution of sodium trichloroacetate may be exemplified by the following equation:

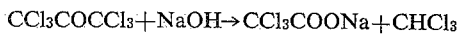

Reaction products comprising an aqueous solution of a metal salt of trichloroacetic acid ($CCl_3COONa$ or $CCl_3COOK$) may then be acidified with excess sulfuric acid in an amount sufficient to liberate trichloroacetic acid and form a bisulfate. Acidification of sodium trichloroacetate solution with sulfuric acid to liberate the trichloroacetic acid, may be exemplified by the following equation:

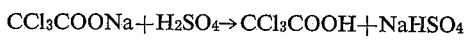

The resultant reaction products, upon standing, separate into an upper layer of aqueous bisulfate solution and a lower layer of chloroform containing trichloroacetic acid dissolved therein; the lower layer may be withdrawn and the chloroform stripped from the mixture leaving substantially pure trichloroacetic acid as bottoms. If desired, some of the stripped chloroform may be returned for admixture with the upper layer which contains small amounts of trichloroacetic acid for the purpose of recovering by extraction the trichloroacetic acid in the bisulfate layer.

The accompanying drawing is a diagrammatic flow sheet illustrating one method of practicing the invention.

Referring to the drawing, hexachloroacetone, a colorless liquid boiling at 202–204° C. at atmospheric pressure, from any suitable external source or which may be prepared by the method described in application Serial No. 92,772, filed May 12, 1949, now Patent No. 2,635,117, is charged through line 1 into reactor 2 which may be an empty enclosed chamber, preferably constructed of stainless steel and provided with a cooling coil 3 and condenser 4. An aqueous solution of a metal alkaline material such as sodium hydroxide, potassium hydroxide or soda ash in approximately molal proportions of alkaline material to hexachloroacetone, is slowly added through line 5 at a rate sufficient to maintain a reaction temperature of about 25–30° C. Since the reaction is exothermic, a cooling medium such as water passing through cooling coil 3 aids in maintaining the temperature of the reaction mixture. Intimate contact between the reactants is assured by means of agitator 6. Care should be taken not to exceed above about 60° C. since sodium trichloroacetate, one of the products of the reaction decomposes above 60° C. At temperatures below about 0° C., the reaction is unduly long and furthermore, operating difficulties may be encountered at low temperatures due to solidification of the hexachloroacetone. As a practical matter, the operation may be conveniently carried out at substantially atmospheric temperature, i. e. 25–30° C. Approximately one hour is required for feeding the aqueous sodium hydroxide into reactor 2. After NaOH has been added, agitation is continued for another hour or until titration of a sample of water layer shows complete consumption of the NaOH. During the course of reaction, chloroform is liberated, a portion of which vaporizes, passing up through vapor line 7 into condenser 4 wherein the chloroform vapor is cooled and condensed by indirect heat exchange with water flowing in through line 8 and out through line 9 and the chloroform condensate returned through liquid reflux line 11 to the reactor. The reflux condenser 4 thus aids in maintaining the temperature of reactants in reactor 2 and further, is a means of retaining the chloroform in the reaction products to serve later as an extraction medium.

If the products of reaction, chloroform and aqueous sodium trichloroacetate, are allowed to settle, they will separate into an upper layer of aqueous sodium trichloroacetate and a lower layer of chloroform. If it is desired to separately recover the chloroform and sodium trichloroacetate as end products, then the lower layer of chloroform is first withdrawn from the bottom of reactor 2 through lines 12, valve 13, line 14 and valve 15 to storage and then the upper layer of aqueous sodium trichloroacetate withdrawn through lines 12 and 14 and directed to storage or, if desired, sent to an evaporator to recover solid sodium trichloroacetate.

However, if it is desired to produce trichloroacetic acid as an end product, it is unnecessary to settle and separate the reaction products in reactor 2 and, in fact, it is advantageous to retain the chloroform in admixture with the reaction products. The reaction products in reactor 2, without separation, are withdrawn through line 12, valve 13 and forced by pump 16 through line 17 into acidifier and extractor chamber 18, similar in construction to reactor 2 and equipped with agitator 19, cooling coil 21 and reflux condenser 22.

Sulfuric acid of about 90–95% concentration, in approximately molal proportion to the amount of sodium trichloroacetate is gradually added to the

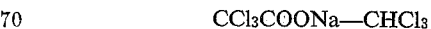

reaction products in acidifier 18 while rapidly agitating and cooling the mixture to maintain a temperature below about 60° C., preferably about 25–30° C. The acidification reaction is quite rapid and completed by the time all the acid is added, a period of about one hour. To insure completion of reaction, agitation may be continued for an additional time of say about one-half hour. Agitation is then terminated and the reaction mixture in reactor 18 permitted to settle, whereupon it separates into an upper layer of aqueous sodium bisulfate and a lower layer of trichloroacetic acid dissolved in chloroform. Approximately 95% of the trichloroacetic acid is dissolved in the lower chloroform layer. The remainder of trichloroacetic acid, usually less than 5%, remains in the upper sodium bisulfate liquor layer.

An important feature of the process resides in carrying the acidification of the sodium trichloroacetate to the bisulfate state thereby producing reaction products in liquid state free of solid precipitates which cause difficulty in separation of desired trichloroacetic acid and chloroform products and loss of these products. Acidification of sodium trichloroacetate solution in the proportion of 2 mols of sodium trichloroacetate to 1 mol of sulfuric acid, resulted in a 3-phase system composed of an upper aqueous layer, a lower trichloroacetic-chloroform layer and solid sodium-sulfate as illustrated by the following equation:

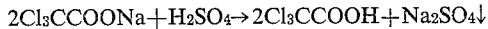

$$2Cl_3CCOONa + H_2SO_4 \rightarrow 2Cl_3CCOOH + Na_2SO_4\downarrow$$

The sodium sulfate salt settles to the bottom and impedes the extraction of the trichloroacetic acid to such an extent that even after four extractions with chloroform, only about 85% of the trichloroacetic acid was recovered.

Acidification of the sodium trichloroacetate with HCl according to the following equation, resulted in a 3-phase system composed of two liquid layers and solid NaCl at interphase.

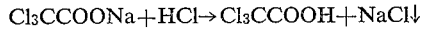

$$Cl_3CCOONa + HCl \rightarrow Cl_3CCOOH + NaCl\downarrow$$

The bottom layer contained only about 82% of the trichloroacetic acid and even after four extractions with equal volumes of chloroform, a total of about 92–93% trichloroacetic acid was recovered.

From the foregoing, it will be evident that carrying the acidification of sodium trichloroacetate to the bisulfate stage has numerous advantages including elimination of solid precipitate which carries with it valuable occluded product and causes difficulty in separation of the product, ease of separation of the liquid layers, and greater recovery of the trichloroacetic acid and chloroform with fewer extraction steps. In addition, the sodium bisulfate has a much higher market value than either sodium chloride or sodium sulfate.

Although the acidification reaction has been described as carried out in the presence of the preferred solvent, chloroform, other solvents which are liquid, immiscible with water and in which trichloroacetic acid is soluble, e. g. toluene, monochlorobenzene, carbon tetrachloride, or petroleum naphthas, may be employed.

The lower layer in acidifier 18 of chloroform having dissolved therein over 95% of the trichloroacetic acid, is withdrawn through line 24, valve 25 into chloroform stripper 26 which may be any suitable conventional evaporator or column equipped with the usual reboiler section to effect vaporization of the low boiling chloroform from the trichloroacetic acid. The chloroform vapors are released from the top of column 26 through line 27, condensed, and directed to storage through line 28 and valve 29. The chloroform produced is quite pure and after minor conventional purification may even be employed for drug purposes. The trichloroacetic acid, which is also quite pure, is discharged from the bottom of column 26, through line 31 and valve 32, directed to storage or, if desired, may be sent to another tank to crystallize.

Although the upper sodium bisulfate liquor layer in acidifier 18 contains less than 5% of the total trichloroacetic acid, an additional 2–3% trichloroacetic acid may be recovered by introducing into acidifier 18 a volume of chloroform equal to the volume of sodium bisulfate liquor either from an external source through lines 33 and 34, or recycling chloroform released from chloroform stripper 26 through line 35 and valve 37. The chloroform-sodium bisulfate liquor is then agitated by stirrer 19 to insure intimate contact, the mixture permitted to settle and separate into a lower chloroform layer, and the chloroform layer directed via line 24 and valve 25 to chloroform stripper 26 for the separation of the mixture into chloroform and trichloroacetic acid. The remaining sodium bisulfate liquor may then be discharged from acidifier 18 and directed through line 37 and valve 38 to a conventional evaporator to recover solid sodium bisulfate.

The operations in reactor 2 and acidifier 18 may be carried out under substantially atmospheric pressure; superatmospheric or subatmospheric pressures add to the cost of the operation and are unnecessary. Also, it will be noted that the reactions in reactor 2 and acidifier 18 are at a low temperature, substantially atmospheric, resulting in greater ease of operation, in less expensive construction of apparatus and, in general, greater efficiency as compared to high temperature, high pressure reactions.

Although the process has been described as being carried out in a batch-wise manner, it is adaptable to continuous operation. The reactor for continuous conversion of hexachloroacetone may be constructed of a tower packed with distributing bodies and cooled by water circulation through a jacket. Hexachloroacetone may be fed into the body of liquid reactants in the tower at a point near the top. Aqueous sodium hydroxide may be introduced near the base of the tower thereby causing continuous countercurrent reaction between the aqueous NaOH and hexachloroacetone. The rate of feed of the reactants should be regulated to permit a residence time in the tower of about 2 hours. Chloroform settling at the bottom of the tower and aqueous trichloroacetate collecting at the top of the tower may be continuously withdrawn from the tower and the commingled streams transferred to a continuous acidifier which may be a column similar to the reactor, with sulfuric acid fed into the tower at a point near the top and reaction products from the reactor introduced at a point near the base of the tower. The upper layer of sodium bisulfate and lower layer of chloroform-trichloroacetic acid may be continuously withdrawn from the tower and then directed to a settling tank to insure sharp separation between the two layers. Alternate settling tanks are desirably employed to insure continuity of operation. The lower layer of chloroform-trichloroacetic acid may then be directed to a falling film continuous type stripper from which chloroform will be removed as overhead and trichloroacetic acid as bottoms from the reboiler. The bisulfate liquor from the settling tank may be sent to a continuous countercurrent-extraction column wherein it will contact condensed chloroform from the continuous stripper. The treated sodium bisulfate liquor may then be directed to an evaporator for recovery of solid sodium bisulfate. The extract may be sent to the falling film continuous stripper for separation of the chloroform from the trichloroacetic acid.

The following example illustrates the invention.

A reactor constructed of stainless steel and equipped with cooling coil, agitator, temperature recorder, reflux condenser for chloroform and bottom take-off as illustrated in the drawing, is charged with 3,322 lbs. of pure hexachloroacetone and, while cooling and agitating, 3,510 lbs. of 20% by weight NaOH solution are run in slowly to the reactor at a rate sufficient to maintain a reaction temperature of 25–50° C. Approximately one hour is required. After NaOH has been added, agitation is continued for another hour.

The reaction product mixture comprising an aqueous solution of sodium trichloroacetate and chloroform totaling 5,832 lbs. is sent to an acidifying and extracting chamber similar in construction to the reactor and also provided with reflux condenser, cooling coil, agitator, temperature recorder and bottom draw-off line. With cooling and with rapid agitation, 1,322 lbs. of 93% sulfuric acid are fed into the acidifier at a rate sufficient to maintain a temperature of 25–30° C. By the time all the acid is added, most of the trichloroacetic acid liberated is in the chloroform bottom layer which is then removed. Then, 1,322 lbs. more chloroform are added to the acidifier chamber to extract an additional amount of trichloroacetic acid from the bisulfate layer remaining in the chamber. In all, 97.5% of the trichloroacetic acid is extracted in these two treatments. 95.4% being removed in the first and 2.1% in the second. The chloroform-trichloroacetic acid extract is sent to a chloroform stripper wherein chloroform is vaporized from the trichloroacetic acid. The sodium bisulfate solution remaining in the acidifier is directed to an evaporator to obtain solid NaHSO$_4$. The trichloroacetic acid product is very pure and contains only a trace of dichloroacetic acid and a little NaHSO$_4$. The chloroform product is of very pure grade and, after redistillation to remove small amounts of impurities, is suitable for drug use. The NaHSO$_4$ solution resulting from the acidification of the sodium trichloroacetate solution contains about 40% NaHSO$_4$ and is supersaturated with respect to the anhydrous salt and will crystallize after standing several hours.

Although certain preferred embodiments of the invention have been disclosed for purpose of illustration it will be evident that various changes and modifications may be made therein without departing from the scope and spirit of the invention.

We claim:

1. A process for the conversion of hexachloroacetone into trichloroacetic acid and chloroform which comprises admixing as the sole reactants hexachloroacetone with an aqueous alkaline solution of an alkali metal compound at a temperature below about 60° C. for a sufficient length of time to effect scission of the hexachloroacetone molecule and reaction with the alkali metal compound in the proportion of one mol hexachloroacetone to about one mol equivalent of alkali metal compound to produce a metal salt of trichloroacetic acid and chloroform and acidifying the mixture of the metal salt of trichloroacetic acid and chloroform by reaction with excess sulfuric acid in an amount sufficient to liberate trichloroacetic acid and form a bisulfate thereby producing acidification reaction products in the liquid state free of solid precipitates.

2. A process for the conversion of hexachloroacetone into trichloroacetic acid and chloroform which comprises intimately mixing as the sole reactants hexachloroacetone with an alkaline aqueous solution of an alkali metal compound at a temperature below 60° C. for a sufficient length of time to effect scission of the hexachloroacetone molecule and reaction with the aqueous alkali metal compound in the proportion of one mol hexachloroacetone to about one mol equivalent of alkali metal compound to produce an aqueous solution of a metal salt of trichloroacetic acid and chloroform, and acidifying the mixture of the aqueous solution of metal salt of a trichloroacetic acid and chloroform by reaction at a temperature below 60° C. with excess sulfuric acid in an amount sufficient to liberate trichloroacetic acid and form a bisulfate thereby producing acidification reaction products in the liquid state free of solid precipitates.

3. A process for the conversion of hexachloroacetone into trichloroacetic acid and chloroform which comprises intimately mixing as the sole reactants hexachloroacetone with an aqueous solution of sodium hydroxide at a temperature below 60° C. for a sufficient length of time to effect scission of the hexachloroacetone molecule and reaction with the aqueous sodium hydroxide in the proportion of one mol hexachloroacetone to about one mol of sodium hydroxide to produce an aqueous solution of sodium trichloroacetone and chloroform, and acidifying the mixture of the aqueous solution of sodium trichloroacetate and chloroform by reaction at a temperature below 60° C. with excess sulfuric acid in an amount sufficient to liberate trichloroacetic acid and form sodium bisulfate thereby producing acidification reaction products in the liquid state free of solid precipitates.

4. A process for the conversion of hexachloroacetone into trichloroacetic acid and chloroform which comprises intimately mixing as the sole reactants hexachloroacetone with an aqueous solution of potassium hydroxide at a temperature below 60° C. for a sufficient length of time to effect scission of the hexachloroacetone molecule and reaction with the aqueous potassium hydroxide in the proportion of one mol hexachloroacetone to about one mol of potassium hydroxide to produce an aqueous solution of potassium trichloroacetate and chloroform, and acidifying the mixture of the aqueous solution of potassium trichloroacetate and chloroform by reaction at a temperature below 60° C. with excess sulfuric acid in an amount sufficient to liberate trichloroacetic acid and form potassium bisulfate thereby producing acidification reaction products in the liquid state free of solid precipitates.

5. A process for the conversion of hexachloroacetone into trichloroacetic acid and chloroform which comprises intimately mixing as the sole reactants hexachloroacetone with an aqueous solution of soda ash at a temperature below 60° C. for a sufficient length of time to effect scission of the hexachloroacetone molecule and reaction with the aqueous soda ash solution in the proportion of one mol hexachloroacetone to about one mol equivalent of soda ash to produce sodium trichloroacetate and chloroform and acidifying the mixture of aqueous solution of sodium trichloroacetate and chloroform by reaction at a temperature below 60° C. with aqueous sulfuric acid in an amount sufficient to liberate trichloroacetic acid and form sodium bisulfate thereby producing acidification reaction products in the liquid state free of solid precipitates.

6. A process for the preparation of trichloroacetic acid from a metal salt of trichloroacetic acid which comprises admixing an aqueous solution of a metal salt of trichloroacetic acid, a liquid solvent characterized by being immiscible with water and miscible with trichloroacetic acid, and an excess of sulfuric acid in an amount sufficient to liberate trichloroacetic acid and form a bisulfate thereby producing acidification reaction products in the liquid state free of solid precipitate, settling the reaction products to permit separation into a layer of aqueous bisulfate solution and a layer of trichloroacetic acid-solvent, separating the trichloroacetic acid-solvent layer from the reaction products and recovering the trichloroacetic acid.

7. A process for the preparation of trichloroacetic acid from sodium trichloroacetate which comprises admixing an aqueous solution of sodium trichloroacetate, chloroform and an excess of sulfuric acid, maintaining the mixture at a temperature below 60° C. for a sufficient length of time to liberate trichloroacetic acid and form sodium bisulfate thereby producing acidification reaction products in the liquid state free of solid precipitates, settling the reaction mixture to form an upper layer of an aqueous solution of sodium bisulfate and a lower layer of trichloroacetic acid-chloroform, separating said lower layer from the reaction products, vaporizing the chloroform from the trichloroacetic acid-chloroform mixture and recovering the trichloroacetic acid.

8. A process for the preparation of trichloroacetic acid from potassium trichloroacetate which comprises admixing an aqueous solution of potassium trichloroacetate, chloroform and an excess of sulfuric acid, maintaining the mixture at a temperature below 60° C. for a sufficient length of time to liberate trichloroacetic acid and form potassium bisulfate thereby producing acidification reaction products in the liquid state free of solid precipitates, settling the reaction mixture to form an upper layer of an aqueous solution of potassium bisulfate and a lower layer of trichloroacetic acid-chloroform, separating said lower layer from the reaction products, vaporizing the chloroform from the trichloroacetic acid-chloroform mixture and recovering the trichloroacetic acid.

9. A process for the conversion of hexachloroacetone into trichloroacetic acid and chloroform which comprises admixing as the sole reactants, hexachloroacetone with an alkaline aqueous solution of an alkali metal compound for a sufficient length of time to effect scission of the hexachloroacetone molecule and reaction with the aqueous alkali metal compound in the proportion of one mol hexachloroacetone to about one mol equivalent of alkali metal compound to produce an aqueous solution of a metal salt of trichloroacetic acid and chloroform, acidifying the aqueous solution of metal salt of trichloroacetic acid in the presence of said chloroform product by reaction with excess sulfuric acid in an amount sufficient to liberate trichloroacetic acid and form a bisulfate thereby producing acidification reaction products in the liquid state free of solid precipitates, settling the acidification reaction products to form an upper layer of aqueous bisulfate solution and a lower layer of trichloroacetic acid-chloroform, separating the lower layer of trichloroacetic acid-chloroform from the reaction products, vaporizing the chloroform from the trichloroacetic acid-chloroform mixture, condensing and collecting the vaporized chloroform and recovering the trichloroacetic acid.

10. A process for the conversion of hexachloroacetone into trichloroacetic acid and chloroform which comprises admixing as the sole reactants hexachloroacetone with an aqueous solution of sodium hydroxide, maintaining the mixture at a temperature within the range of 0° C. to 60° C. for a sufficient length of time to effect scission of the hexachloroacetone molecule and reaction with the aqueous sodium hydroxide solution in the proportion of one mol hexachloroacetone to about one mol of sodium hydroxide to produce an aqueous solution of sodium trichloroacetate and chloroform, acidifying the aqueous solution of sodium trichloroacetate in the presence of the chloroform product with sulfuric acid in the proportion of about 1 mol of sulfuric acid to 1 mol of sodium trichloroacetate, maintaining the mixture at a temperature below 60° C. for a sufficient length of time to liberate trichloroacetic acid and form sodium bisulfate, settling the acidification reaction products to form an upper layer of aqueous sodium bisulfate and a lower layer of trichloroacetic acid-chloroform, separating the lower layer from the acidification reaction products, vaporizing the chloroform from the trichloroacetic acid-chloroform mixture and recovering the chloroform and trichloroacetic acid as separate products.

11. A process for the conversion of hexachloroacetone into trichloroacetic acid and chloroform which comprises admixing as the sole reactants hexachloroacetone with an aqueous solution of potassium hydroxide, maintaining the mixture at a temperature within the range of 0° C. to 60° C. for a sufficient length of time to effect scission of the hexachloroacetone molecule and reaction with the aqueous potassium hydroxide solution in the proportion of one mol hexachloroacetone to about one mol of potassium hydroxide to produce an aqueous solution of potassium trichloroacetate and chloroform, acidifying the aqueous solution of potassium trichloroacetate in the presence of the chloroform product with sulfuric acid in the proportion of about 1 mol of sulfuric acid to 1 mol of potassium trichloroacetate, maintaining the mixture at a temperature below 60° C. for a sufficient length of time to liberate trichloroacetic acid and form potassium bisulfate, settling the acidification reaction products to form an upper layer of aqueous potassium bisulfate and a lower layer of trichloroacetic acid-chloroform, separating the lower layer from the acidification reaction products, vaporizing the chloroform from the trichloroacetic acid-chloroform mixture and recovering the chloroform and trichloroacetic acid as separate products.

12. A process for the conversion of hexachloroacetone into trichloroacetic acid and chloroform which comprises admixing as the sole reactants hexachloroacetone with an aqueous solution of sodium hydroxide, maintaining the mixture at a temperature within the range of 0° C. to 60° C. for a sufficient length of time to effect scission of the hexachloroacetone molecule and reaction with the aqueous sodium hydroxide solution in the proportion of one mol hexachloroacetone to about one mol of sodium hydroxide to produce an aqueous solution of sodium trichloroacetate and chloroform, acidifying the aqueous solution of sodium trichloroacetate in the presence of the chloroform product with sulfuric acid in the proportion of about 1 mol of sulfuric acid to 1 mol of sodium trichloroacetate, maintaining the mixture at a temperature below 60° C. for a sufficient length of time to liberate trichloroacetic acid and form sodium bisulfate, settling the acidification reaction products to form an upper layer of aqueous sodium bisulfate and a lower layer of trichloroacetic acid-chloroform, separating the lower layer from the acidification reaction products, vaporizing chloroform from the trichloroacetic acid-chloroform mixture, condensing the chloroform vapors, returning a portion of the chloroform condensate in contact with the upper layer of aqueous sodium bisulfate solution to extract therefrom additional trichloroacetic acid, separating the trichloroacetic acid-chloroform extract after contact with the aqueous sodium bisulfate solution and vaporizing chloroform from the trichloroacetic acid-chloroform extract.

13. A process for the conversion of hexachloroacetone which comprises admixing as the sole reactants hexachloroacetone with an alkaline aqueous solution of an alkali metal compound, maintaining the mixture at a temperature within the range of 0° C. to about 60° C. for a sufficient length of time to effect scission of the hexachloroacetone molecule and reaction with the aqueous solution of alkali metal compound in the proportion of one mol hexachloroacetone to about one mol equivalent of alkali metal compound to produce a metal salt of trichloroacetic acid and chloroform.

14. A process for the conversion of hexachloroacetone which comprises admixing as the sole reactants hexachloroacetone with an aqueous solution of sodium hydroxide and maintaining the mixture at a temperature within the range of 0° C. to 60° C. for a sufficient length of time to effect scission of the hexachloroacetone molecule and reaction with the sodium hydroxide in the proportion of one mol hexachloroacetone to about one mol of sodium hydroxide to produce sodium trichloroacetate and chloroform.

15. A process for the conversion of hexachloroacetone which comprises admixing as the sole reactants hexachloroacetone with an aqueous solution of potassium hydroxide and maintaining the mixture at a temperature within the range of 0° C. to 60° C. for a sufficient length of time to effect scission of the hexachloroacetone molecule and reaction with the potassium hydroxide in the proportion of one mole hexachloroacetone to about one mol of potassium hydroxide to produce potassium trichloroacetate and chloroform.

16. A process for the conversion of hexachloroacetone which comprises admixing as the sole reactants hexachloroacetone with an aqueous solution of soda ash and maintaining the mixture for a sufficient length of time to effect scission of the hexachloroacetone molecule and reaction with the aqueous solution of soda ash in the proportion of one mol hexachloroacetone to about one mol equivalent of soda ash to produce sodium trichloroacetate and chloroform.

References Cited in the file of this patent

UNITED STATES PATENTS

| Number | Name | Date |
|---|---|---|
| 2,371,757 | Henne | Mar. 20, 1945 |
| 2,414,706 | Babcock et al. | Jan. 21, 1947 |
| 2,442,995 | Coffman | June 8, 1948 |
| 2,480,467 | Haworth et al. | Aug. 30, 1949 |

FOREIGN PATENTS

| Number | Country | Date |
|---|---|---|
| 577,481 | Great Britain | May 20, 1946 |

OTHER REFERENCES

Cloez, Ann. de Chim. et Phys., 6ᵉ Serie, vol. 9, pp. 199–205 (1886).

Brochet and others, Beilstein (Handbuch, 4th ed.) vol. 1, pp. 656–7 (1918).

Beilstein (Handbuch 4th ed.), vol. I, 1st sup., p. 345 (1928).

Richter, Organic Chem., vol. 1, page 291 (3d Eng. Ed.).